(12) United States Patent
Hira

(10) Patent No.: US 10,924,352 B2
(45) Date of Patent: Feb. 16, 2021

(54) DATA CENTER NETWORK TOPOLOGY DISCOVERY

(71) Applicant: Nicira, Inc., Palo Alto, CA (US)

(72) Inventor: Mukesh Hira, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/872,992

(22) Filed: Jan. 17, 2018

(65) Prior Publication Data
US 2019/0222481 A1 Jul. 18, 2019

(51) Int. Cl.
*H04L 12/24* (2006.01)
*H04L 29/08* (2006.01)
*H04L 12/26* (2006.01)

(52) U.S. Cl.
CPC .......... *H04L 41/12* (2013.01); *H04L 41/0853* (2013.01); *H04L 43/10* (2013.01); *H04L 67/2804* (2013.01)

(58) Field of Classification Search
CPC ...... H04L 41/12; H04L 43/10; H04L 67/2804
See application file for complete search history.

(56) References Cited

U.S. PATENT DOCUMENTS

| | | |
|---|---|---|
| 6,711,152 B1 | 3/2004 | Kalmanek, Jr. et al. |
| 7,068,667 B2 | 6/2006 | Foster et al. |
| 8,671,176 B1 | 3/2014 | Kharitonov et al. |
| 10,190,810 B2 | 1/2019 | Ramirez, Jr. |
| 10,320,681 B2 | 6/2019 | Hira et al. |
| 10,771,389 B2 | 9/2020 | Hira et al. |
| 2002/0145981 A1 | 10/2002 | Klinker et al. |
| 2002/0150229 A1 | 10/2002 | Riihinen et al. |
| 2007/0283024 A1 | 12/2007 | Landrum et al. |
| 2011/0302346 A1 | 12/2011 | Vahdat et al. |
| 2013/0100816 A1 | 4/2013 | Bergamasco et al. |
| 2013/0107729 A1* | 5/2013 | Wagner ............... H04L 43/0852 370/252 |
| 2013/0223275 A1* | 8/2013 | Vasseur .................. H04L 45/26 370/254 |

(Continued)

FOREIGN PATENT DOCUMENTS

GB 2493710 A 2/2013

OTHER PUBLICATIONS

Jin et al. Title: "Your Data center switch is trying too hard" ACM 2016 (Year: 2016).*

(Continued)

*Primary Examiner* — Rina C Pancholi
(74) *Attorney, Agent, or Firm* — Su IP Consulting

(57) ABSTRACT

Example methods are provided a first node to perform data center network topology discovery in a data center network. One example method may comprise the first node receiving multiple probe packets that include a first probe packet and a second probe packet in response to a probing process initiated by a second node. The method may also comprise extracting, from the first probe packet, first metadata that is added by a first subset of multiple intermediate network devices and extracting, from the second probe packet, second metadata that is added by a second subset of the multiple intermediate network devices. The method may further comprise processing the first metadata and the second metadata to identify respective first forwarding path and second forwarding path from the second node to the first node.

21 Claims, 9 Drawing Sheets

(56) References Cited

U.S. PATENT DOCUMENTS

| | | |
|---|---|---|
| 2014/0047252 A1 | 2/2014 | Ansari et al. |
| 2016/0277953 A1 | 9/2016 | Andersson et al. |
| 2017/0295100 A1 | 10/2017 | Hira et al. |
| 2017/0295101 A1* | 10/2017 | Hira .................... H04L 43/0876 |
| 2018/0159770 A1* | 6/2018 | Nakagawa .............. H04L 41/12 |
| 2019/0104075 A1 | 4/2019 | Li et al. |

OTHER PUBLICATIONS

Sin Jin et al., "Your Data Center Switch is Trying Too Hard", In proceedings of ACM Symposium on SDN Research (SOSR), Retrieved on Jan. 17, 2018 from the <URL: http://www.cs.princeton.edu/~jrex/papers/sourcey16.pdf>, 2016.

Nanxi Kang et al., "Optimizing the "One Big Switch" Abstraction in Software-Defined Networks", CoNEXT'13, Dec. 9-12, 2013, ACM.

Mohammad Alizadeh et al., "On the Data Path Performance of Leaf-Spine Datacenter Fabrics", IEEE 21st Annual Symposium on High-Performance Interconnects, 2013, pp. 71-74.

Jonathan Perry et al., "Fastpass: A Centralized "Zero-Queue" Datacenter Network", SIGCOMM, 2014, pp. 307-318, ACM.

Vimalkumar Jeyakumar et al., "EyeQ: Practical Netwok Performance Isolation at the Edge", 10th USENIX Symposium on Networked System Design and Implementation (NSDI'13), 2013, pp. 297-311, USENIX Association.

Lucian Popa et al., "FairCloud: Sharing the Network in Cloud Computing", HotNets-X, (New York, NY, USA), pp. 22:1-22:6, ACM, 2011.

Mohammad Alizadeh et al., "pFabric: Minimal Near-Optimal Datacenter Transport", SIGCOMM'13, Aug. 12-16, 2013, ACM.

Mosharaf Chowdhury et al., "Efficient Coflow Scheduling with Varys", SIGCOMM'14, Aug. 17-22, 2014, ACM.

Mohammad Al-Fares et al., "Hedera: Dynamic Flow Scheduling for Data Center Networks", NSDI 2010, (Berkeley, CA, USA), pp. 19-19, USENIX Association.

Theophilus Benson et al., "MiceroTE: Fine Grained Traffic Engineering for Data Centers", CoNEXT 2011, Dec. 6-9, 2011, ACM.

Jiaxin Cao et al, "Per-packet Load-balanced, Low-Latency Routing for Clos-based Data Center Networks", CoNEXT 13, Dec. 9-12, 2013, pp. 49-60, ACM.

Srikanth Kandula et al., "Dynamic Load Balancing Without Packet Reordering", ACM SIGCOMM Computer Communication Review, Apr. 2007, pp. 53-62, No. 2, vol. 37.

Siddhartha Sen et al, "Scalable, Opimal Flow Routing in Datacenters via Local Link Balancing", CoNEXT'13, Dec. 9-12, 2013, ACM.

Mohammad Alizadeh et al., "CONGA: Distributed Congestion-Aware Load Balancing for Datacenters", SIGCOMM'14, Aug. 17-22, 2014, ACM.

Chi-Yao Hong et al., "Achieving High Utilization with Software-Driven WAN", SIGCOMM'13, Aug. 12-16, 2013, pp. 15-26, ACM.

Sushant Jain et al., "B4: Experience with a Globally-Deployed Software Defined WAN", SIGCOMM'13, Aug. 12-16, 2013, ACM.

Pat Bosshart et al., "Forwarding Metamorphosis: Fast Programmable Match-Action Processing in Hardware for SDN", SIGCOMM'13, Aug. 12-16, 2013, ACM.

International Search Report and Written Opinion of the International Searching Authority, International application No. PCT/US2017/027190, dated Jun. 9, 2017.

"Cavium and XPliant Introduce a Fully Programmable Switch Silicon Family Scaling to 3.2 Terabits per Second", News & Evnet, Retrieved on Aug. 24, 2017 from the Internet at <URL: http://tinyurl.com/nzbqtr3>.

Pat Bosshat et al., "P4: Programming Protocal-Independent Packet Processors", ACM SIGCOMM Computer Communication Review, Jul. 2014, pp. 88-95, No. 3, vol. 44.

Naga Katta et al., "HULA: Scalable Load Balancing Using Programmable Data Planes", SOSR'16, Mar. 14-15, 2016, ACM.

Radhika Niranjan Mysore et al., "PortLand: A Scalable Fault-Tolerant Layer 2 Data Center Network Fabric", SIGCOMM'09, Aug. 17-21, 2009, ACM.

"Cisco's Massively Scalable Data Center", Sep. 2015, Retrieved from <URL: http://www.cisco.com/c/dam/en/us/td/docs/solutions/Enterprise/Data_Center/MSDC/1-/MSDC_AAG_1.pdf>.

"BCM56850 Series: High-Capacity StrataXGS Trident II Et ernet Switc Series", Broadcom, Retrieved on Aug. 25, 2017 from the Internet at <URL: http://www.broadcom.com/products/Switching/Data-Center/BCM56850-Series>.

Shuihai Hu et al., "Explicit Path Control in Commodity Data Centers: Design and APplications", Proceedings of the 12th USENIX Symposium on Networked Systems Design and Implementation (NSDI'15), May 4-6, 2015, pp. 15-28.

Albert Greenberg et al., "VL2: A Scalable and Flexible Data Center Network", SIGCOMM'09, Aug. 17-21, 2009, ACM.

Chuanxiong Guo et al., "BCube: A High Performance, Server-centric Network Architecture for Modular Data Centers", SIGCOMM'09, Aug. 17-21, 2009, pp. 63-74, ACM.

Eleftheria Athanasopoulou et al., "Backpressure-based Packet-by-Packet Adaptive Routing in Communication Networks", IEEE/ACM Trans. Netw., vol. 21, pp. 244-257, Feb. 2013.

Baruch Awerbuch et al., "A Simple Local-Control Approximation Algorithm for Multicommodity Flow", Proceedings of the 34th IEEE Conf. on Found. of Computer Science, Oct. 1993.

"The P4 Language Specification", The P4 Language Consortium-Version 1.1.0, Nov. 18, 2015, pp. 109.

Sivasankar Radhakrishnan et al., "Dahu: Commodity Switches for Direct Connect Data Center Networks", ANCS, 2013, pp. 59-70, IEEE Press.

Anirudh Sivaraman et al., "Packet Transactions: A Programming Model for Data-Plane Algorithms at Hardware Speed", CoRR, 2015.

"Protocol-independent Switch Architecture," Jun. 4, 2015, Retrieved from <URL: http://schd.ws/hosted_files/p4workshop2015/c9/NickM-P4-Workshop-June-04-2015.pdf>.

"Members of the p4 consortium", Retrieved on Aug. 29, 2017 from <URL: http://p4.org/join-us/>.

Anirudh Sivaraman, "P4's Action-execution Semantics and Conditional Operators," Massachusetts Institute of Technology, Retrieved from the <URL: https://github.com/anirudhSK/p4-semantics/raw/master/p4-semantics.pdf>.

Mohammad Alizadeh et al., Data Center TCP (DCTCP), SIGCOMM'10, Aug. 30-Sep. 3, 2010, ACM.

Keqiang He et al., "Presto: Edge-based Load Balancing for Fast Datacenter Networks", SIGCOMM'15, Aug. 17-21, 2015, ACM.

Costin Raiciu et al., "Improving Datacenter Performance and Robustness with Multipath TCP", SIGCOMM'11, Aug. 15-19, 2011, pp. 266-277, ACM.

Wei Bai et al., "Information-Agnostic Flow Scheduling for Commodity Data Centers", NSDI'15, 2015, pp. 455-468, USENIX Association.

David Zats et al., "DeTail: Reducing the Flow Completion Time Tail in Datacenter Networks", SIGCOMM'12, Aug. 13-17, 2012, pp. 139-150, ACM.

Srikanth Kandula et al., "Walking the Tightrope: Responsive Yet Stable Traffic Engineering", SIGCOMM'05, Aug. 21-26, 2005, ACM.

Anwar Elwalid et al., "MATE: MPLS Adaptive Traffic Engineering", IEEE Infocom, 2001.

Nithin Michael et al., "HALO: Hop-by-Hop Adaptive Link-State Optimal Routing", IEEE/ACM Transactions on Networking, Dec. 2015, pp. 1862-1875, No. 6, vol. 23.

M. Mahalingam et al., "Virtual eXtensible Local Area Network (VXLAN): A Framework for Overlaying Virtualized Layer 2 Networks ovr Layer 3 Networks", Informational, IETF RFC 7348, Aug. 2014.

Nathan Farrington et al., "Data Center Switch Architecture in the Age of Merchant Silicon", 17th IEEE Symposium on High Performance Interconnects, 2009, pp. 93-102.

Zhiruo Cao et al., "Performance of Hasing-Based Schemes for Internet Load Balancing", IEEE Infocom, 2000, pp. 332-341.

(56) References Cited

OTHER PUBLICATIONS

Communication Pursuant to Article 94(3) EPC, Application No. 17 719 462.8-1216, Oct. 9, 2019.

* cited by examiner

| | [source_ID][switch_ID, port_in, port_out] | |
|---|---|---|
| P11 | [Host-A][T1,i1,i2][A1,i1,i2][S1,i1,i4] | 511 |
| P12 | [Host-A][T1,i1,i2][A1,i1,i2][S1,i1,i4][A4,i3,i1] | 512 |
| P13 | [Host-A][T1,i1,i2][A1,i1,i2][S1,i1,i4][A4,i3,i1][T2,i3,i1] | 513 |
| P14 | [Host-A][T1,i1,i3] | 514 |
| P15 | [Host-A][T1,i1,i3][A3,i1,i2] | 515 |
| P16 | [Host-A][T1,i1,i3][A3,i1,i2][S1,i3,i4] | 516 |
| P17 | [Host-A][T1,i1,i3][A3,i1,i2][S1,i3,i4][A4,i3,i1] | 517 |
| P18 | [Host-A][T1,i1,i3][A3,i1,i2][S1,i3,i4][A4,i3,i1][T2,i3,i1] | 518 |
| P19 | [Host-A][T1,i1,i3][A3,i1,i2][S1,i3,i2] | 519 |
| P20 | [Host-A][T1,i1,i3][A3,i1,i2][S1,i3,i2][A2,i3,i1] | 520 |
| P21 | [Host-A][T1,i1,i3][A3,i1,i2][S1,i3,i2][A2,i3,i1][T2,i2,i1] | 521 |

| | [source_ID][switch_ID, port_in, port_out] | |
|---|---|---|
| P22 | [Host-A][T1,i1,i2][A1,i1,i3][S2,i1,i4] | 622 |
| P23 | [Host-A][T1,i1,i2][A1,i1,i3][S2,i1,i4][A4,i2,i1] | 623 |
| P24 | [Host-A][T1,i1,i2][A1,i1,i3][S2,i1,i4][A4,i2,i1][T2,i3,i1] | 624 |
| P25 | [Host-A][T1,i1,i3] | 625 |
| P26 | [Host-A][T1,i1,i3][A3,i1,i3] | 626 |
| P27 | [Host-A][T1,i1,i3][A3,i1,i3][S2,i3,i4] | 627 |
| P28 | [Host-A][T1,i1,i3][A3,i1,i3][S2,i3,i4][A4,i2,i1] | 628 |
| P29 | [Host-A][T1,i1,i3][A3,i1,i3][S2,i3,i4][A4,i2,i1][T2,i3,i1] | 629 |
| P30 | [Host-A][T1,i1,i3][A3,i1,i3][S2,i3,i2] | 630 |
| P31 | [Host-A][T1,i1,i3][A3,i1,i3][S2,i3,i2][A2,i2,i1] | 631 |
| P32 | [Host-A][T1,i1,i3][A3,i1,i3][S2,i3,i2][A2,i2,i1][T2,i2,i1] | 632 |

US 10,924,352 B2

DATA CENTER NETWORK TOPOLOGY DISCOVERY

BACKGROUND

Unless otherwise indicated herein, the approaches described in this section are not admitted to be prior art by inclusion in this section.

Data centers generally employ multi-rooted topologies that are characterized by a large degree of multipathing. For example, physical hosts are connected with each other using a number of intermediate network devices (e.g., switches, routers, etc.) that provide alternative paths for packet forwarding. When one host has data to send to another host in a data center, packets carrying the data may be transmitted via one of the paths. In practice, hosts may not have an accurate view of the data center network topology, which may be required for the hosts to perform a range of operations.

DETAILED DESCRIPTION

Figure 1:
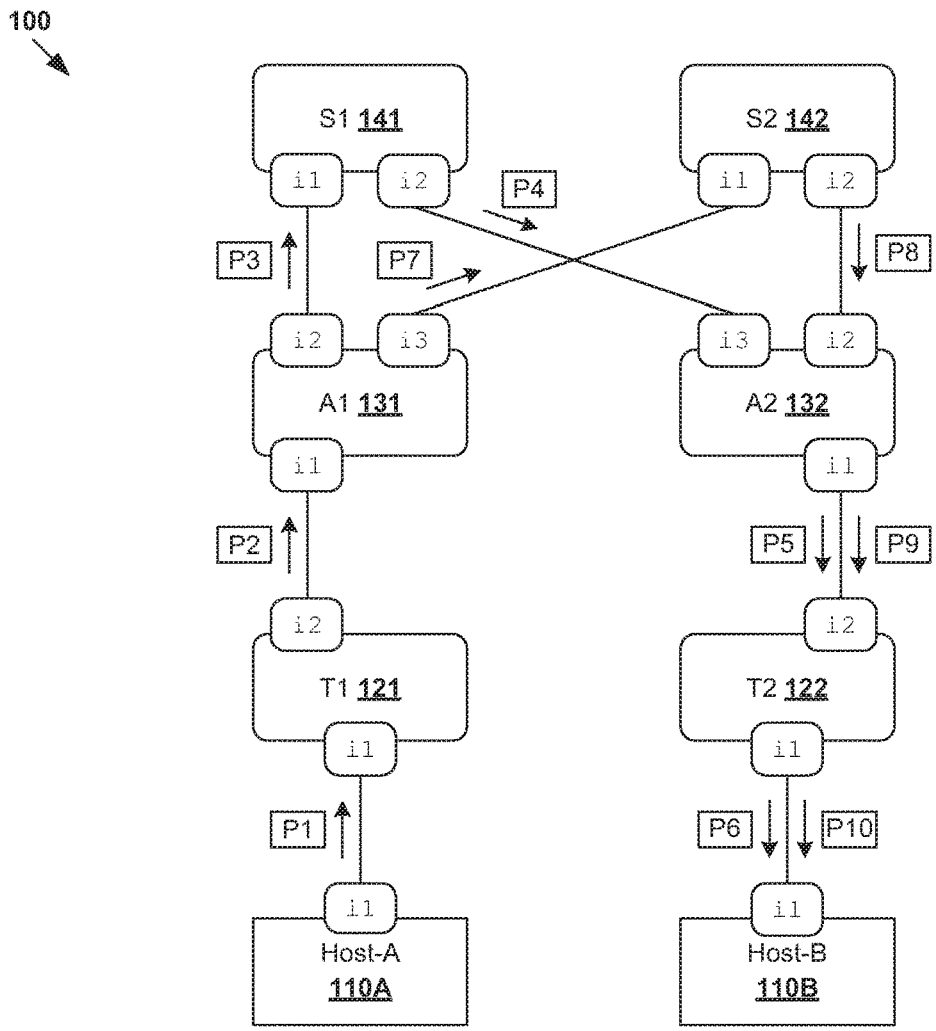
FIG. 1 is a schematic diagram illustrating an example data center network in which data center network topology discovery may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to data center network topology discovery will now be explained in more detail using FIG. 1, which is a schematic diagram illustrating example data center network 100 in which data center network topology discovery may be performed. It should be understood that, depending on the desired implementation, data center network 100 may include additional and/or alternative components than that shown in FIG. 1.

In the example in FIG. 1, data center network 100 includes a first node (see host-B 110B) and a second node (see host-A 110A) that are connected via multiple intermediate network devices, such as network switches labelled "T1" 121, "A1" 131, "S1" 141, "S2" 142, "A2" 132 and "T2" 122. In the example network topology shown, the switches form two alternative forwarding paths between Host-A 110A and host-B 110B. A first forwarding path is provided by "T1" 121, "A1" 131, "S1" 141, "A2" 132 and "T2" 122, while a second forwarding path is provided by "T1" 121, "A1" 131, "S2" 142, "A2" 132 and "T2" 122.

Although two alternative forwarding paths are shown in FIG. 1 for simplicity, the number of forwarding paths depends on the number of inter-connected switches and the topology of data center network 100, such as a multi-rooted topology (e.g., leaf-spine topology, fat-tree topology, etc.) that provides bisection bandwidth. As used herein, the term "intermediate network device" may refer generally to any suitable physical or logical network element configured to receive and forward packets, such as layer-2 switch, layer-3 router, gateway, bridge, etc. Depending on the network topology, a "switch" may be a physical switch or software-implemented switch, top-of-rack (ToR) switch, aggregate switch, spine switch, etc. The term "layer-2" generally refers to a Media Access Control (MAC) layer and "layer-3" to a network layer in the Open System Interconnection (OSI) model, although the concepts described herein may be applicable to other networking models.

Hosts 110A-B will be explained in more detail using FIG. 2, which is a schematic diagram illustrating physical implementation view 200 of example data center network 100 in FIG. 1. Depending on the desired implementation, physical implementation view 200 may include additional and/or alternative component(s) than that shown in FIG. 2. In the example in FIG. 2, hosts 110A-B (also known as "end hosts," "computing devices", "host computers", "host devices", "physical servers", "server systems", "physical machines" etc.) each include virtualization software (e.g., hypervisor 214A/214B) that maintains a mapping between underlying hardware 212A/212B and virtual resources allocated to VMs 231-234. Hosts 110A-B are interconnected via physical network 205 formed by various intermediate network devices, such as ToR switches 121-122, aggregate switches 131-132 and spine switches 141-142 in FIG. 1.

Hardware 212A/212B includes suitable physical components, such as processor(s) 220A/220B; memory 222A/222B; physical network interface controller(s) or NIC(s) 224A/224B; and storage disk(s) 228A/228B accessible via storage controller(s) 226A/226B, etc. Virtual resources are allocated to each VM to support a guest operating system (OS) and applications (not shown for simplicity). Corresponding to hardware 212A/212B, the virtual resources may include virtual CPU, virtual memory, virtual disk, virtual network interface controller (VNIC), etc. Hardware resources may be emulated using virtual machine monitors (VMMs) 241-244, which may be considered as part of (or alternatively separated from) corresponding VMs 231-234. For example in FIG. 2, VNICs 251-254 are emulated by corresponding VMMs 241-244.

Hypervisor 214A/s14B further implements virtual switch 215A/215B and logical distributed router (DR) instance 217A/217B to handle egress packets from, and ingress packets to, corresponding VMs 231-234. In data center network 100, logical switches and logical distributed routers may be implemented in a distributed manner and can span multiple hosts to connect VMs 231-234. For example, logical switches that provide logical layer-2 connectivity may be implemented collectively by virtual switches 215A-B and represented internally using forwarding tables 216A-B at respective virtual switches 215A-B. Forwarding tables 216A-B may each include entries that collectively implement the respective logical switches. Further, logical distributed routers that provide logical layer-3 connectivity may be implemented collectively by DR instances 217A-B and represented internally using routing tables 218A-B at respective DR instances 217A-B. Routing tables 218A-B may be each include entries that collectively implement the respective logical distributed routers.

A logical router may be a logical distributed routers (DR), logical service routers (SR), or a combination of both. A DR represents a distributed routing component that is deployed to provide routing services for virtualized computing instances to which the DR is connected. A DR may be implemented in a distributed manner in that it may span multiple hosts that support those virtualized computing instances. An SR (also known as an edge node) represents a centralized routing component that is deployed to provide centralized stateful services, such as firewall protection, load balancing, network address translation (NAT), etc. In the example in FIG. 1, VM1 231 and VM3 233 may be configured as SRs to connect various VMs (on the same host or different hosts) to physical network 205.

Packets may be received from, or sent to, each VM via an associated logical port. For example, logical ports 261-264 are associated with respective VMs 231-234. Here, the term "logical port" may refer generally to a port on a logical switch to which a virtualized computing instance is connected. A "logical switch" may refer generally to a software-defined networking (SDN) construct that is collectively implemented by virtual switches 215A-B in the example in FIG. 1, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them). The term "packet" may refer generally to a group of bits that can be transported together from a source to a destination, such as message, segment, datagram, etc.

Although examples of the present disclosure refer to virtual machines, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Figure 2:
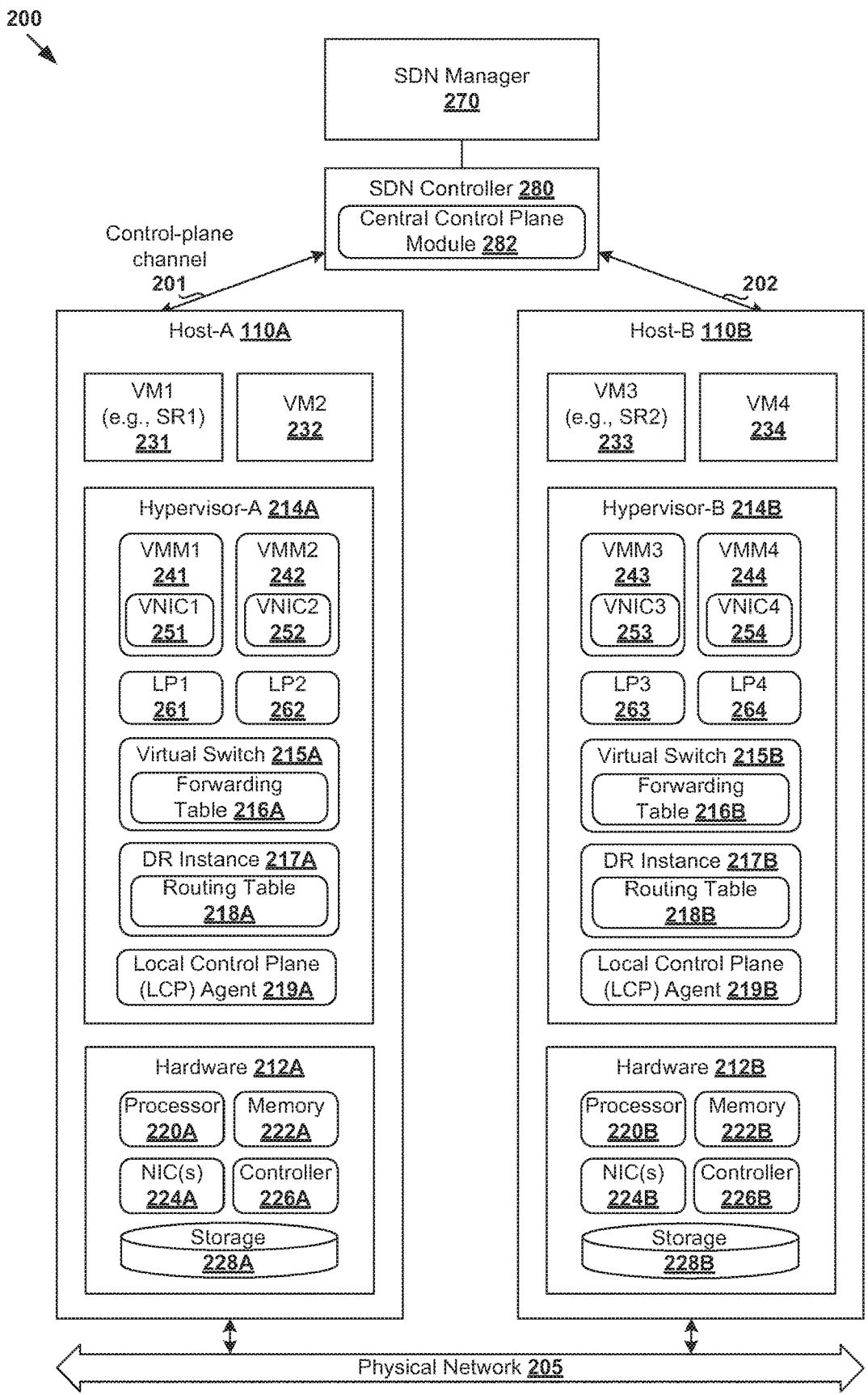
FIG. 2 is a schematic diagram illustrating example host in the data center network in FIG. 1.

Further in FIG. 2, SDN controller 280 and SDN manager 270 are example network management entities that facilitate implementation of software-defined networks (e.g., logical overlay networks). One example of an SDN controller is the NSX controller component of VMware NSX® (available from VMware, Inc.) that operates on a central control plane. SDN controller 280 may be a member of a controller cluster (not shown for simplicity) that is configurable using SDN manager 270 operating on a management plane. Network management entity 270/280 may be implemented using physical machine(s), VM(s), or both. Logical switches, logical routers, and logical overlay networks may be configured using SDN manager 270, SDN controller 280, etc. To send or receive control information, local control plane (LCP) agent 219A/219B on host 210A/210B may interact with central control plane module 282 at SDN controller 280 via control-plane channel 201/202.

Conventionally, data center network topology discovery generally necessitates the participation of a management entity (e.g., SDN controller 280). According to this control-plane approach, the management entity is configured to collect and disseminate control information relating to the network topology of data center network 100 to hosts 110A-B. However, due to its centralized nature, the control-plane approach may react slower to topology changes, etc. In this case, hosts 110A-B may not have an accurate view of the data center network topology. This may make it more challenging for hosts 110A-B to perform a range of operations, such as packet forwarding, monitoring, fault reporting, debugging etc.

Data Center Network Topology Discovery

According to examples of the present disclosure, data center network topology discovery may be performed by one node (e.g., host-B 110B) based on probe packets that are received in response to a probing process initiated by another node (e.g., host-A 110A). As will be described further below, hosts 110A-B may rely on capabilities of intermediate network devices (e.g., telemetry capabilities) to add metadata to probe packets during the probing process. Unlike conventional control-plane approaches, examples of the present disclosure may facilitate a more rapid discovery of topology changes in data center network 100 with a relatively low overhead and improved scalability.

Firstly, using a data-plane approach, it is not necessary for notifications relating to topology changes to first go to the central control plane, which then computes the impacted paths before the affected hosts and/or network devices are notified. The data-plane approach facilitates a faster reaction to topology changes, which in turn allows tracking of rapidly changing states (e.g., link utilization, etc.) and reduces the likelihood of sub-optimal decision making based on stale state information. Secondly, examples of the present disclosure may ameliorate scalability problems associated with conventional control-plane approaches. For example, if network elements are required to report network state information to the central control plane on a per-packet basis. the volume of reports generally becomes extremely large and causes a slower reaction to topology changes. Thirdly, the data-plane approach generally does not have deployment issues associated with the central control plane. For example, a separate, out-of-band network or differentiated forwarding in the data plane is required to implement the central control plane because otherwise it would experience the same congestion reported to it in the first place.

Figure 3:
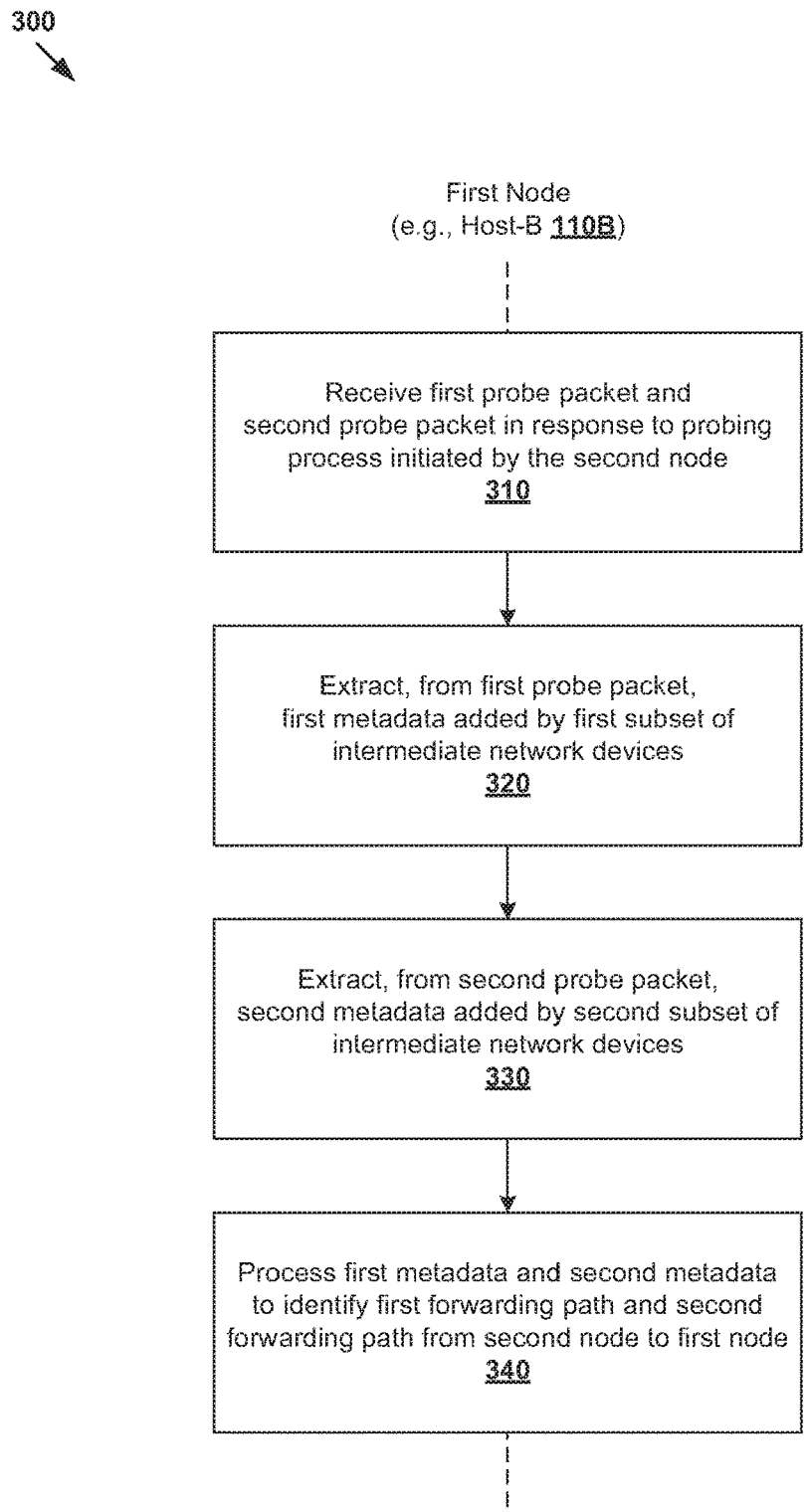
FIG. 3 is a flowchart of an example process for a host to perform data center network topology discovery in a data center network.

In more detail, FIG. 3 is a flowchart of example process 300 for a host to perform data center network topology discovery in data center network 100. Example process 300 may include one or more operations, functions, or actions illustrated by one or more blocks, such as 310 to 340. The various blocks may be combined into fewer blocks, divided into additional blocks, and/or eliminated depending on the desired implementation. In the following, an example "first node" will be explained using host-B 110B, an example "second node" using host-A 110A and example "intermediate network devices" using switches 121-122, 131-132, 141-142. In practice, example process 300 may be implemented by host-B 110B using any suitable component(s), such as hypervisor 114B, VM1 231 configured as an SR, etc. Throughout the present disclosure, it should be understood that although the terms "first" and "second" are used to describe various elements, these elements should not be limited by these terms. These terms are used to distinguish one element from another. For example, a first element may be referred to as a second element, and vice versa.

At 310 in FIG. 3, host-B 110B receives multiple probe packets that include a first probe packet labelled "P6" (see 156 in FIG. 1) and a second probe packet labelled "P10" (see 160 in FIG. 1). The probe packets may be received in response to a probing process initiated by host-A 110A. At 320 and 330, host-B 110B extracts first metadata from first probe packet "P6" and second metadata from second probe packet "P10." At 340, host-B 110B processes the first metadata and the second metadata to identify respective first forwarding path 171 and second forwarding path 172 from host-A 110A to host-B 110B.

In the example in FIG. 1, first probe packet "P6" 156 received by host-B 110B may include first metadata added by "T1" 121, "A1" 131, "S1" 141, "A2" 132 and "T2" 122 ("first subset of the intermediate network devices") based on a first instruction in the first probe packet. In this case, host-B 110B may process the first metadata to identify a first forwarding path from host-A 110A to host-B 110B that is provided by [T1, A1, S1, A2, T2]. See corresponding 171 in FIG. 1.

Second probe packet "P10" 160 received by host-B 110B may include second metadata added by "T1" 121, "A1" 131, "S2" 142, "A2" 132 and "T2" 122 ("second subset of the intermediate network devices") based on a second instruction in the second probe packet. In this case, host-B 110B may process the second metadata to identify a second forwarding path from host-A 110A to host-B 110B that is provided by [T1, A1, S2, A2, T2]. See corresponding 172 in FIG. 1.

As will be described further using FIG. 4 to FIG. 8, examples of the present disclosure may be implemented to enable each host in data center network 100 to identify all forwarding paths to and/or from all other hosts. In practice, the first and second metadata may include device-level information (e.g., switch_ID in FIG. 1), ingress port information (e.g., ingress port ID denoted as port_in), egress port information (e.g., egress port ID denoted as port_out), buffer information, etc. In the following, detailed examples will be explained using FIG. 4, example implementation in a data center network with a multi-rooted topology using FIG. 5, FIG. 6 and FIG. 7 and example applications such as intelligent packet forwarding using FIG. 8.

As will be described using FIG. 9, examples of the present disclosure may be performed using virtualized computing instances as "nodes." In other words, "first node" (i.e., probe packet recipient) and "second node" (i.e., probe packet originator) in FIG. 3 may be physical hosts (e.g., hosts 110A-B in FIG. 1), virtualized computing instances (e.g., VMs 911-912 in FIG. 9), or a combination of both. Also, "intermediate network devices" may be physical network devices (e.g., physical switches, routers, etc.), logical network devices (e.g., logical switches, logical routers, etc.), or a combination of both.

Detailed Example

Figure 4:
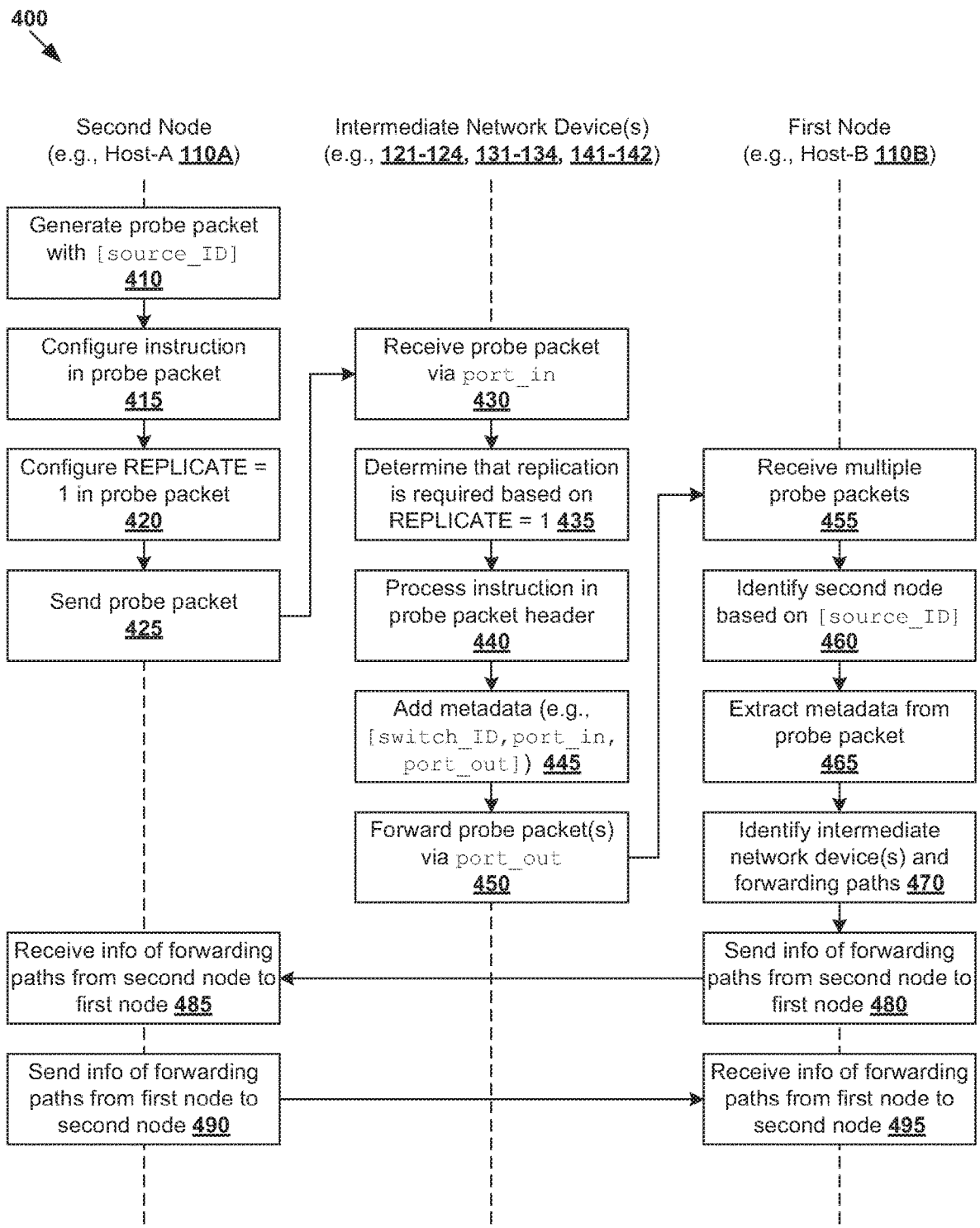
FIG. 4 is a flowchart of an example detailed process for a host to perform data center network topology discovery in a data center network.

FIG. 4 is a flowchart of example detailed process 400 for data center network topology discovery in data center network 100. Example process 400 may include one or more operations, functions, or actions illustrated at 410 to 495. The various operations, functions or actions may be combined into fewer blocks, divided into additional blocks, and/or eliminated depending on the desired implementation. Similar to the example in FIG. 3, an example "first node" will be explained using first host-B 110B, an example "second node" using second host-A 110A and example "intermediate network devices" using switches 121-122, 131-132, 141-142.

(a) Initiation of Probing Process

Using the example in FIG. 1, host-A 110A initiates a probing process by generating and sending a probe packet labelled "P1" (see 151 in FIG. 1) according to blocks 410-425 in FIG. 4. In particular, according to 410 and 415 in FIG. 4, probe packet "P1" 151 is configured to include source_ID=[host-A] to identify source host-A 110A, and an instruction to cause intermediate network device(s) to add metadata into the probe packet as the probe packet is being forwarded in data center network 100.

Any suitable format may be used for the probe packets. For example, Inband Network Telemetry (INT) is a framework designed to allow the collection and reporting of network state information, by the data plane, without requiring any intervention of the control plane. According to the INT architectural model, probe packets include fields to store telemetry instructions that cause INT-capable network devices to modify the probe packets when forwarding the packets. Using the INT architecture model, the telemetry instruction (e.g., "first instruction" and "second instruction" in FIG. 2) may be encoded as a bitmap where each bit corresponds to a particular type of metadata to be added into the probe packet. The instruction may be encoded (e.g., 16-bit field) as part of a "hop-by-hop header that is interpretable or processable by the intermediate network devices.

Depending on the desired implementation, the metadata may include device-level information, ingress information, egress port information, buffer information, any combination thereof, etc. For example, device-level information may include a switch ID (denoted as switch_ID) that is unique within a management domain, etc. Ingress port information may include an ingress port ID (denoted as port_in) via which the probe packet is received, ingress timestamp, ingress port receive (RX) packet count, ingress port RX byte count, ingress port drop count, ingress port RX utilization, etc.

Egress port information may include an egress port ID (denoted as port_out) via which the probe packet is sent, egress timestamp, hop latency (i.e., time taken for the packet to be switched within the network device), egress port transmit (TX) packet count, egress port TX byte count, egress port drop count, egress port TX link utilization (i.e., current utilization of the egress port), etc. Intermediate network devices may keep track of the current link utilization using any suitable mechanism, such as bin bucketing, moving average, etc. Buffer information may include a queue ID, queue occupancy information (instantaneous queue length, average queue length, etc.), queue congestion status (e.g., used buffer space relative to maximum buffer space), queue drop count, etc. For simplicity, the instruction in probe packet "P1" 151 is encoded to instruct intermediate network devices to add metadata in the form of [switch_ID, port_in, port_out]. Any alternative and/or additional metadata may be used.

Further, at 420 in FIG. 4, host-A 110A configures probe packet "P1" 151 to include a REPLICATE bit=1 to instruct intermediate network device(s) to replicate the probe packet to explore all forwarding paths from host-A 110A. For example, the REPLICATE bit may be configured to request port-level (layer-2) replication, next-hop-level (layer-3) replication, or both. In the example in FIG. 1, port-level replication may be requested such that the intermediate network devices replicate the probe packet on all its ports. At 425, host-A 110A sends probe packet "P1" 151 via egress port "i1."

(b) Adding Metadata to Probe Packets

Referring to "T1" 121 in FIG. 1, metadata is added to probe packet "P1" 151. In particular, according to 430 and 435 in FIG. 4, in response to receiving probe packet "P1" 151 via port_in=i1, "T1" 121 determines that probe replication is required based on REPLICATE=1. Further, according to 440 and 445 FIG. 4, "T1" 121 modifies probe packet "P1" 151 by adding metadata [switch_ID=T1, port_in=i2, port_out=i1]. This results in a modified probe packet labelled "P2" 152, which is then forwarded via port_out=i2 according to block 450 in FIG. 4.

At "A1" 131, in response to receiving probe packet "P2" 152 via port_in =i1, the probe packet is modified and replicated to generate probe packets "P3" 153 and "P7" 157 according to 430-450 in FIG. 4. Compared to "T1" 121, "A1" 131 has multiple egress ports. As such, "A1" 131 generates probe packet "P3" 153 by adding metadata [switch_ID=A1, port_in =i1, port_out=i2] into probe packet "P2" 152, and forwards probe packet "P3" 153 via first port_out=i2. Further, "A1l" 131 generates probe packet "P4" 154 by adding metadata [switch_ID=A1, port_in =i1, port_out=i3] into probe packet "P2" 152, and forwards probe packet "P4" 154 via second port_out=i3.

At "S1" 141, probe packet "P3" 153 is modified to generate probe packet "P4" 154 according to 430-450 in FIG. 4. "S1" 141 generates probe packet "P4" 154 by adding metadata [switch_ID=S1, port_in=i1, port_out=i2] into probe packet "P3" 153. Probe packet "P4" 154 is then forwarded via port_out=i2.

At "S2" 142, probe packet "P7" 157 is modified to generate probe packet "P8" 158 according to 430-450 in FIG. 4. "S2" 142 generates probe packet "P8" 158 by adding metadata [switch_ID=S2, port_in=i1, port_out=i2] into probe packet "P7" 157. Probe packet "P8" 158 is then forwarded via port_out=i2.

At "A2" 132, two probe packets are received. First probe packet "P4" 154 is modified to generate probe packet "P5" 155 with added metadata [switch_ID=A2, port_in=i3, port_out=i1]. Second probe packet "P9" 159 is modified to generate probe packet "P8" 158 with added metadata [switch_ID=A2, port_in=i2, port_out=i1]. Probe packets "P5" 155 and "P9" 159 are forwarded via port_out=i1.

At "T2" 122, two probe packets are received. First probe packet "P5" 155 is modified to generate probe packet "P6" 156 that further includes [switch_ID=T2, port_in=i2, port_out=i1]. Similarly, second probe packet "P9" 159 is modified to generate probe packet "P10" 160 that further includes [switch_ID=T2, port_in=i2, port_out=i1]. Probe packets "P6" 156 and "P10" 160 are forwarded via port_out=i1.

(c) Probe Packet Processing

At host-B 110B, network topology discovery is performed according to blocks 310-340 in FIG. 3 and blocks 455-470 in FIG. 4. In particular, at 455 and 460, in response to receiving first probe packet "P6" 156 and second probe packet "P10" 160, host-B 110B identifies host-A 110A to be a source host based on metadata [source_ID=host-A] in each probe packet 156/160. Further, at 465 and 470, host-B 110B extracts metadata [switch_ID, port_in, port_out] from each probe packet 156/160 to identify multiple forwarding paths from host-A 110A to host-B 110B.

In more detail, first probe packet "P6" 156 includes first metadata=[T1, i1, i2] [A1, i1, i2] [S1, i1, i2] [A2, i3, i1] [T2, i2, i1] that identifies a series of intermediate network devices that have forwarded the probe packet from host-A 110A to host-B 110B (and their port information of those devices). In particular, host-B 110B identifies "T1" 121 based on [T1, i1, i2], "A1" 131 based on [A1, i1, i2], "S1" 141 based on [S1, i1, i2], "A2" 132 based on [A2, i3, i1] and "T2" 122 based on [T2, i2, i1]. By processing the metadata, host-B 110A identifies a first forwarding path from host-A 110A to host-B 110B provided by a first set of intermediate network devices=[T1, A1, S1, A2, T2]. See corresponding 171 in FIG. 1.

Second probe packet "P10" 160 includes second metadata=[T1, i1, i2] [A1, i1, i3] [S2, i1, i2] [A2, i3, i1] [T2, i2, i1] that identifies another series of intermediate network devices that have forwarded the probe packet from host-A 110A to host-B 110B. In particular, host-B 110B identifies "T1" 121 based on [T1, i1, i2], "A1" 131 based on [A1, i1, i3], "S2" 142 based on [S2, i1, i2], "A2" 132 based on [A2, i3, i1] and "T2" 122 based on [T2, i2, i1]. By processing the metadata, host-B 110A identifies a second forwarding path from host-A 110A to host-B 110B provided by a second set of intermediate network devices=[T1, A1, S1, A2, T2]. See corresponding 172 in FIG. 1.

Multi-Rooted Topology

Figure 5:
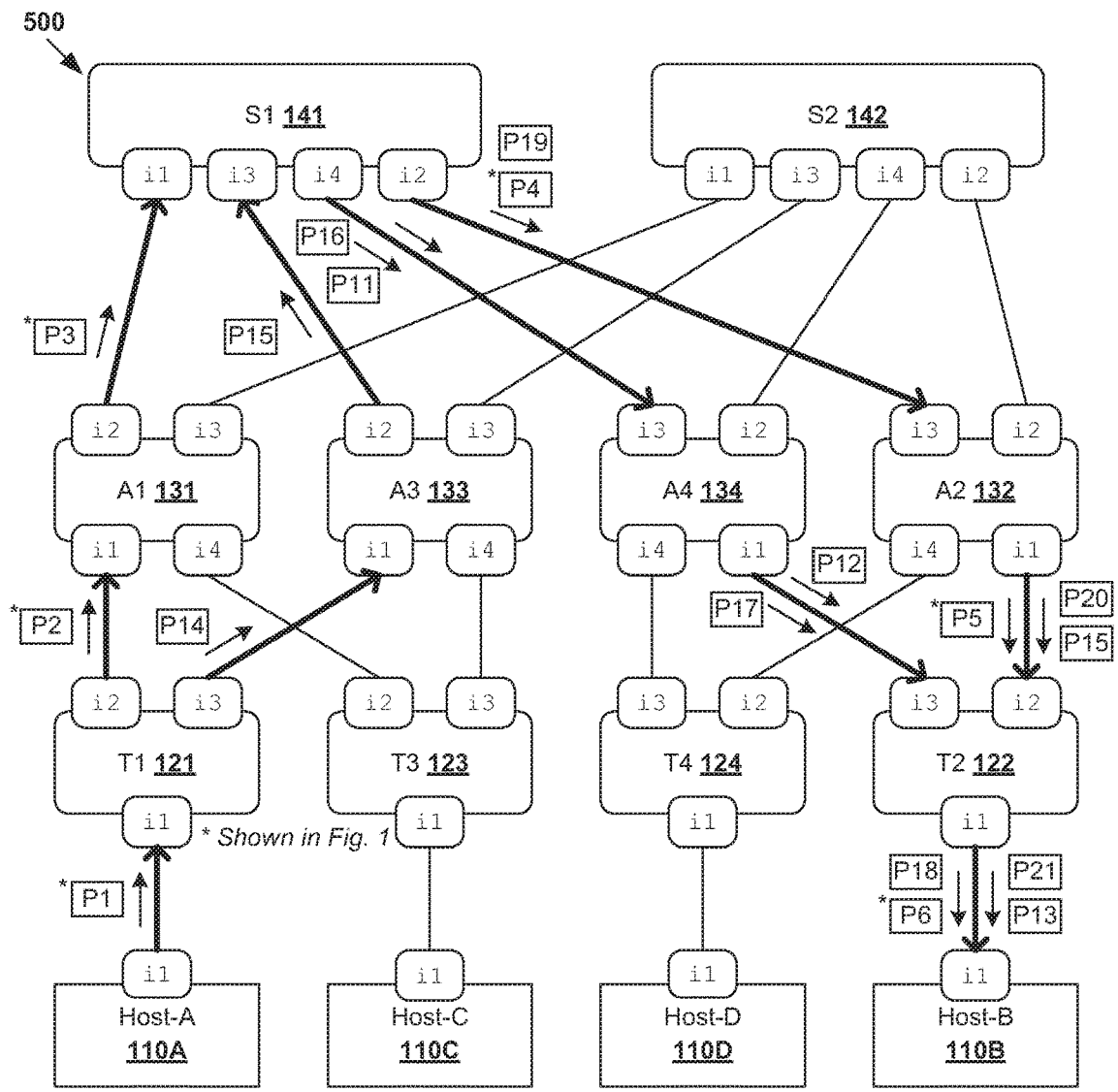
FIG. 5 is a schematic diagram illustrating an example data center network with a multi-rooted topology in which a first example network topology discovery may be performed in according to the example in FIG. 4.
Figure 6:
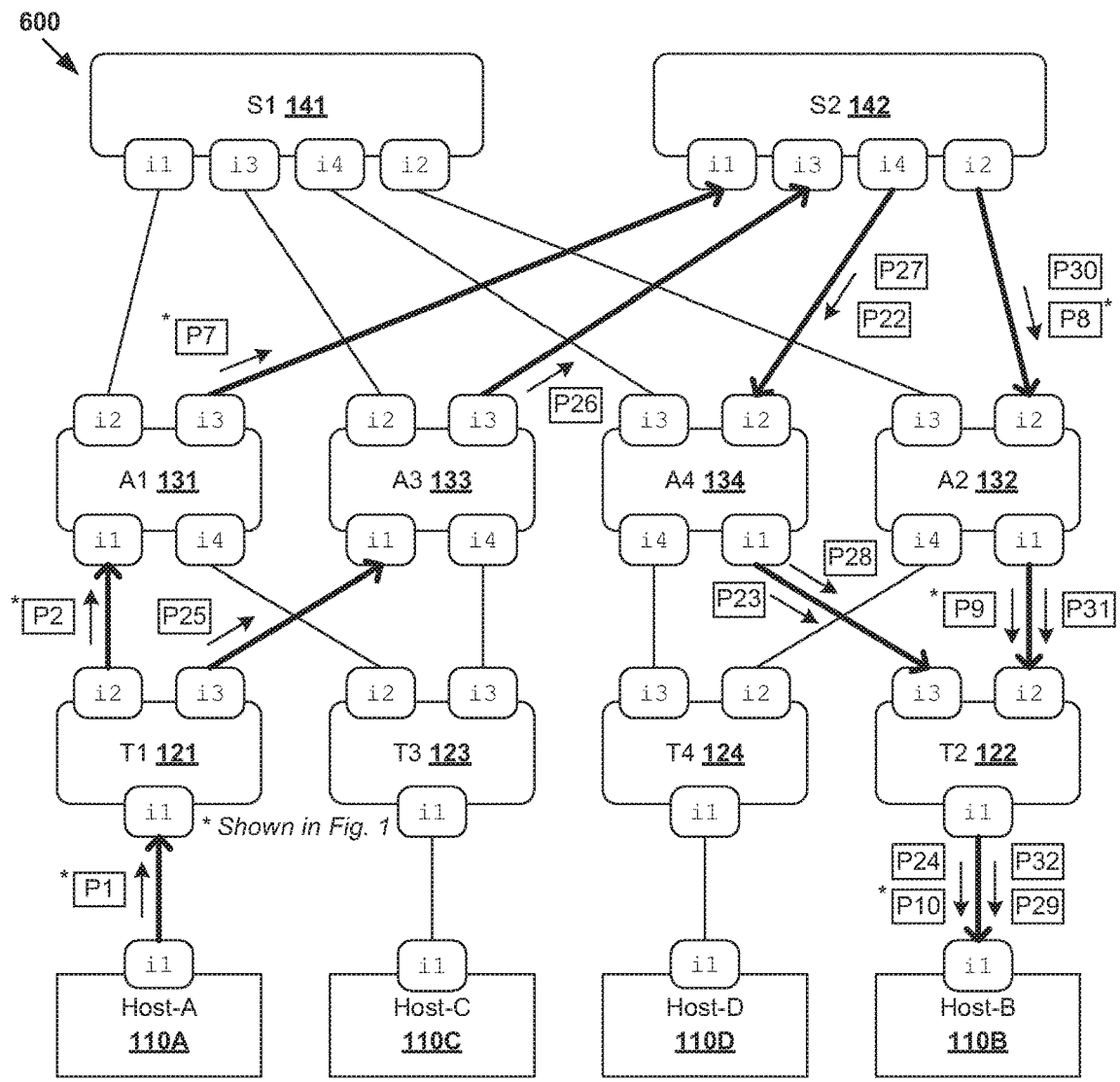
FIG. 6 is a schematic diagram illustrating an example data center network with a multi-rooted topology in which a second example network topology discovery may be performed in according to the example in FIG. 4.

The example in FIG. 4 will now be explained using FIG. 5 and FIG. 6. FIG. 5 is a schematic diagram illustrating example data center network 500 with a multi-rooted topology in which first example network topology discovery may be performed in according to the example in FIG. 4. FIG. 6 is a schematic diagram illustrating example data center network 600 with a multi-rooted topology in which second example network topology discovery may be performed in according to the example in FIG. 4. Details of probe packets labelled "P1" to "P6" in FIG. 5 and "P7" to "P10" in FIG. 6 (see asterisks) have been described using FIG. 1 to FIG. 4 and will not be repeated here for brevity.

Referring first to FIG. 5, data center network 500 further includes host-C 110C ("third node") and host-D 110D ("fourth node"), and additional intermediate network devices 123, 124, 133, 134 compared to the example in FIG. 1. In particular, hosts 110A-D are inter-connected using multiple tiers of switches, including ToR switches (e.g., "T1" 121, "T2" 122, "T3" 123 and "T4" 124) forming a first tier, aggregate switches (e.g., "A1" 131, "A2" 132, "A3" 133, "A4" 134) forming a second tier, and spine switches (e.g., "S1" 141 and "S2" 142) forming a third tier. In practice, the number of tiers (i.e., depth) may depend on the bandwidth capacity required in data center network 500.

A switch may be referred to as "downstream" or "upstream" from the perspective of another switch depending on their relative position. For example, if a switch is in tier j (e.g., "A1" 131 on tier j=2), a directly connected switch in a lower tier k<j is known as its "downstream" switch (e.g., "T1" 121 and "T3" 123 in lower tier k=1). On the other hand, a directly connected switch in an upper tier k>j is known as its "upstream" switch (e.g., "S1" 141 and "S2" 142 in upper tier k=3). It should be understood that any other suitable topology than that shown in FIG. 4 may be used. For example, topologies such as fat-tree, Clos, Virtual Layer 2 (VL2), etc. also use the notions of "upstream" and "downstream."

In the example in FIG. 5, a probing process is initiated by a host (e.g., host-A 110A) and probe packets are replicated and propagated until they reach another host (e.g., host-B 110B). If a probe packet is received from a downstream switch, it will be replicated or propagated to all other upstream and downstream switches. However, if a probe packet is received from an upstream switch, the probe packet is only replicated or propagated to all downstream switches, but not the upstream switches. This ensures that no probe packet loops forever in data center network 500. In practice, any other alternative or additional techniques may be used to prevent probe packets from looping forever, such as setting a maximum hop count in the probe packets.

Compared to the example in FIG. 1, additional forwarding paths are provided by aggregate switches "A3" 133 and "A4" 134 in FIG. 5. In this case, due to probe packet replication, host-B 110B receives three additional probe packets labelled "P13" (see 513), "P18" (see 518) and "P21" (see 521). Probe packet "P13" (see 513) includes [source_ID=host-A] in probe packet "P1" generated by host-A 110A, as well as metadata in probe packets "P2" added by "T1" 121 (see 152 in FIG. 1), "P11" by "S1" 141 (see 511) and "P12" (see 512) by "A4" 134. In response to receiving probe packet "P13" (see 513), host-B 110B may process metadata=[T1, i1, i2] [A1, i1, i2] [S1, i1, i4] [A4, i3, i1] [T2, i3, i1] to identify a third forwarding path provided by a third subset of intermediate network devices=[T1, A1, S1, A4, T2] from host-A 110A to host-B 110B.

Probe packet "P18" (see 518) includes [source_ID=host-A] in probe packet "P1" generated by host-A 110A, as well as metadata added by "T1" 121 to "P14" (see 514), by "A3" 133 to "P15" (see 515), by "S1" 141 to "P16" (see 516) and by "A4" 134 to "P17" (see 517). In response to receiving probe packet "P18" (see 518), host-B 110B may process metadata=[T1, i1, i3] [A3, i1, i2] [S1, i3, i4] [A4, i3, i1] [T2, i3, i1] to identify a fourth forwarding path provided by a fourth subset=[T1, A3, S1, A4, T2].

Probe packet "P21" (see 521) includes [source_ID=host-A] in probe packet "P1" generated by host-A 110A, as well as metadata added by "T1" 121 to "P14" (see 514), by "A3" 133 to "P15" (see 515), by "S1" 141 to "P19" (see 519) and by "A2" 132 to "P20" (see 520). In response to receiving probe packet "P21" (see 521), host-B 110B may process metadata=[T1, i1, i3] [A3, i1, i2] [S1, i3, i2] [A2, i3, i1] [T2, i2, i1] to identify a fifth forwarding path that includes a fifth subset=[T1, A3, S1, A2, T2].

Referring now to FIG. 6, additional forwarding paths are provided by "S2" 142. In addition to the examples in FIG. 5, host-B 110B receives three probe packets labelled "P24" (see 624), "P29" (see 629) and "P32" (see 632). Similarly, probe packets "P24," "P29" and "P32" each include [source_ID=host-A] in probe packet "P1" generated by host-A 110A.

Probe packet "P24" (see 624) includes metadata in probe packets "P2" added by "T1" 121, "P7" by "A1" 131, "P22" (see 622) by "S2" 142 and "P23" (see 623) by "A4" 134, and further metadata added by "T2" 122. In response to receiving probe packet "P24" (see 624), host-B 110B may process metadata=[T1, i1, i2] [A1, i1, i3] [S2, i1, i4] [A4, i2, i1] [T2, i3, i1] to identify a sixth forwarding path provided by a sixth subset=[T1, A1, S2, A4, T2].

Probe packet "P29" (see 629) includes metadata in probe packets "P25" added by "T1" 121 (see 625), "P26" by "A3" 133 (see 626), "P27" (see 627) by "S2" 142 and "P28" by "A4" 134 (see 623), and further metadata added by "T2" 122. In response to receiving probe packet "P29" (see 629), host-B 110B may process metadata=[T1, i1, i3] [A3, i1, i3] [S2, i3, i4] [A4, i2, i1] [T2, i3, i1] to identify a seventh forwarding path provided by a seventh subset=[T1, A3, S2, A4, T2].

Probe packet "P29" (see 629) includes metadata in probe packets "P25" added by "T1" 121 (see 625), "P26" by "A3" 133 (see 626), "P30" (see 630) by "S2" 142 and "P31" by "A2" 132 (see 631), and further metadata added by "T2" 122. In response to receiving probe packet "P29" (see 629), host-B 110B may process metadata=[T1, i1, i3] [A3, i1, i3] [S2, i3, i2] [A2, i2, i1] [T2, i2, i1] to identify a sixth forwarding path from host-A 110A to host-B 110B provided by an eighth subset of intermediate network devices=[T1, A3, S2, A2, T2].

The above data center network topology discovery examples may be implemented by all hosts 110A-D in data center network 500/600. For example in FIG. 5 and FIG. 6, hosts 110C-D will also receive probe packets in response to the probing process initiated by host-A 110A. Similarly, hosts 110B-D may each initiate their own probing process such that every other host may learn forwarding paths in data center network 500/600 in a similar manner. In practice, periodic probing may be performed such that hosts 110A-D are able to learn the latest forwarding paths in data center network 500/600 and/or detect any topology changes that may affect other operations (e.g., packet forwarding, monitoring, debugging, etc.).

Figure 7:
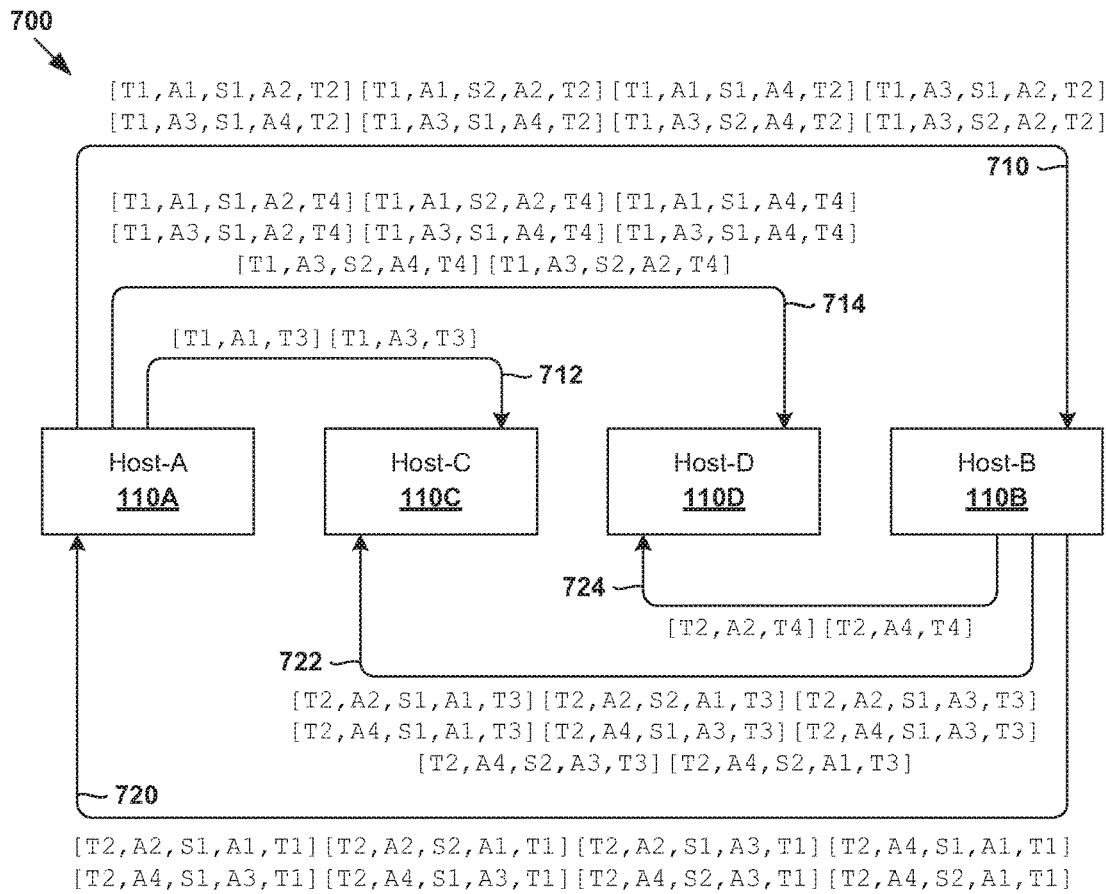
FIG. 7 is a schematic diagram illustrating example forwarding paths identified by hosts in FIG. 5 and FIG. 6 according to the example in FIG. 4.
Figure 7:
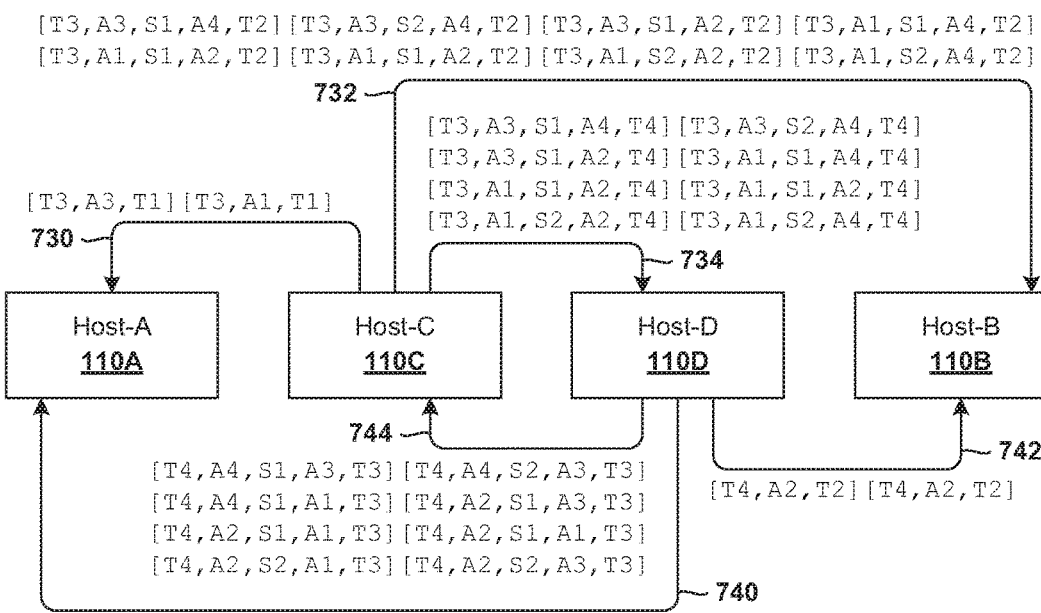

A summary of data center network topology discovery by hosts 110A-C is shown in FIG. 7, which is a schematic diagram illustrating example forwarding paths identified by hosts 110A-D in FIG. 5 and FIG. 6 according to the example in FIG. 4. At 710-714 in FIG. 7, based on a first probing process initiated by host-A 110A, host-B 110B and host-D 110D both identify eight forwarding paths from host-A 110A (see 710, 714), while host-C 110C identifies two forwarding paths (see 712.

At 720-724 in FIG. 7, host-B 110B may initiate a probing process that causes probe packets with metadata added by intermediate network devices to reach host-A 110A, host-C 110C and host-D 110D. Based on their respective probe packets, host-A 110A and host-C 110C both discover eight forwarding paths from host-B 110B (see 720, 722), while host-D 110D discovers two forwarding paths (see 724).

At 730-734 in FIG. 7, host-C 110C may initiate a probing process that causes probe packets with metadata added by intermediate network devices to reach host-A 110A, host-B 110B and host-D 110D. Based on their respective probe packets, host-B 110B and host-D 110D both discover eight forwarding paths from host-C 110C (see 730, 732), while host-A 110A discovers two forwarding paths (see 734).

At 740-744 in FIG. 7, host-D 110D may initiate a probing process that causes probe packets with metadata added by intermediate network devices to reach host-A 110A, host-B 110B and host-C 110C. Based on the probe packets, host-A 110A and host-C 110C both discover eight forwarding paths from host-D 110D (see 740, 742), while host-B 110B discovers two forwarding paths (see 744).

In practice, the routing between a pair of hosts is "symmetric" if both use the same set of forwarding paths for bidirectional communication. For example in FIG. 5 and FIG. 6, the same set of forwarding paths from host-A 110A to host-B 110B may be used by host-B 110B to send packets to host-A 110A in the reverse direction. In contrast, in the case of "asymmetric" routing, different forwarding paths may be used in one direction compared to the reverse direction. To enable host-A 110A to learn the forwarding paths discovered by host-B 110B, host-B 110B may feed the information back to host-A 110A.

Referring to the example in FIG. 4 again, at 480 and 485, host-B 110B may feed or send, to host-A 110A information identifying forwarding paths (see 710) from host-A 110A to host-B 110B. Similarly, at 490 and 495, host-A 110A may send, to host-B 110B information identifying forwarding paths (see 720) from host-B 110B to host-A 110A. Such information exchange may be implemented between any pair of hosts. This way, in case of asymmetric routing, each host will be able to discover all forwarding paths to and from every other host in data center network 500/600.

Example Applications

According to examples of the present disclosure, acquiring the knowledge of data center network topology opens up the possibility of a number of applications that may be implemented by hosts 110A-D. For example, forwarding paths learned during data center network topology discovery may be used to facilitate continuous monitoring and fault reporting, debugging of application performance problems (e.g., caused by in physical network fabric 205 from a single pane of glass), intelligent routing or packet forwarding where routing decisions are driven by end hosts instead of intermediate network devices connecting them, etc.

An example intelligent routing will be explained using FIG. 8, which is a flowchart of example process 800 for packet forwarding based on forwarding paths identified during data center network topology discovery in data center network 100. Example process 800 may include one or more operations, functions, or actions illustrated at 810 to 855. The various operations, functions or actions may be combined into fewer blocks, divided into additional blocks, and/or eliminated depending on the desired implementation. Similar to the above examples, an example "first node" will be explained using host-B 110B, an example "second node" using host-A 110A and example "intermediate network devices" using switches 121-122, 131-132, 141-142. For simplicity, FIG. 8 will be explained using data center network 100 in FIG. 1.

Figure 8:
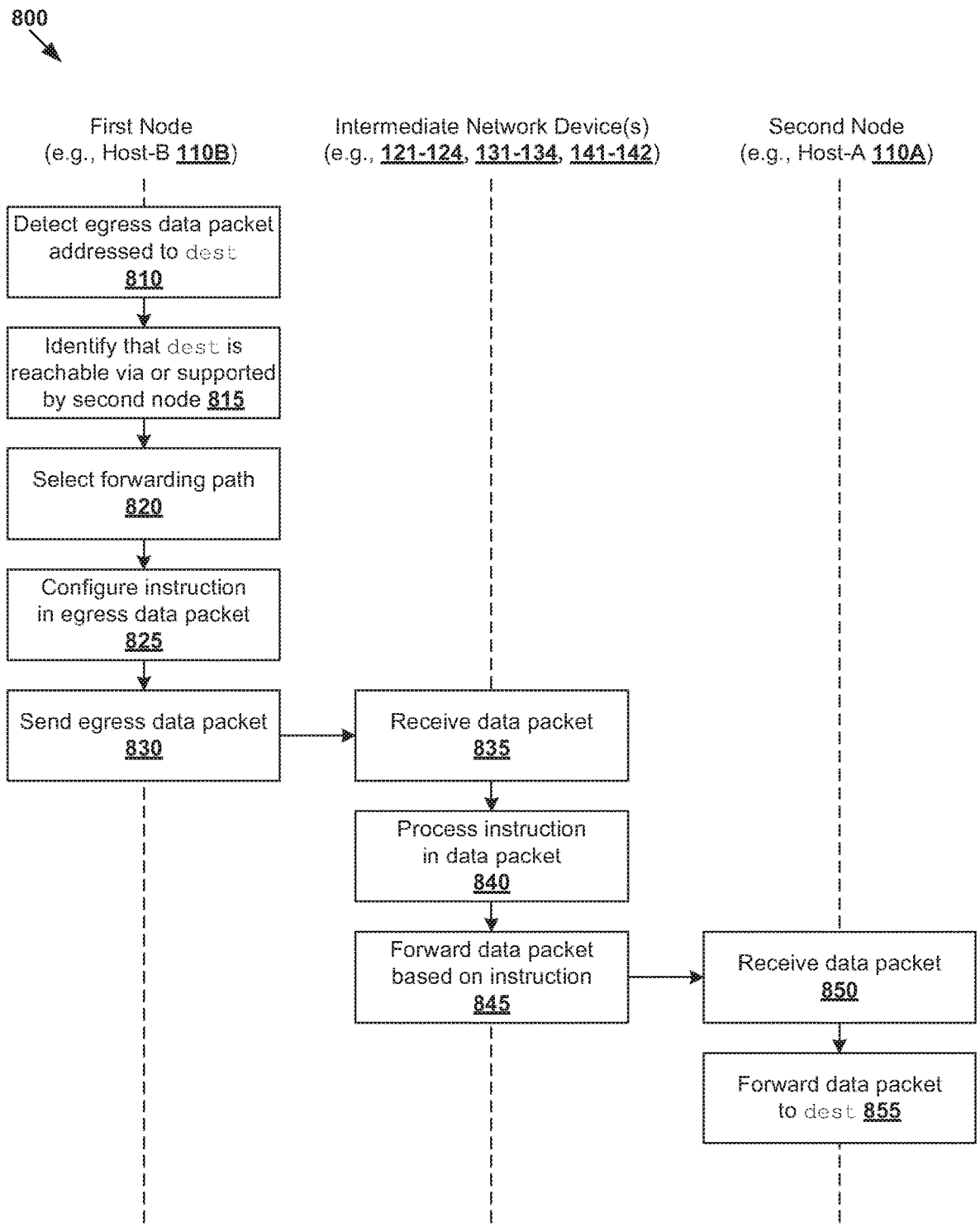
FIG. 8 is a flowchart of an example process for packet forwarding based on forwarding paths identified during data center network topology discovery in a data center network.

At 810-815 in FIG. 8, host-B 110B detects an egress data packet addressed to a destination that is supported by host-A 110A or reachable via host-A 110A. Using the example in FIG. 2, the destination may be any suitable destination endpoint, such as VM2 232 or any other virtualized computing instance supported by or reachable via host-A 110A. The egress data packet may be generated by any suitable source endpoint, such as VM4 234 or any virtualized computing instance supported by, or connected to, host-B 110B. In practice, the term "endpoint" may refer generally an originating node ("source endpoint") or terminating node ("destination endpoint") of a bi-directional inter-process communication flow. In practice, an endpoint may be a physical device, a virtualized computing instance supported by a physical device, etc.

At 820 in FIG. 8, host-B 110B selects either first forwarding path 171 or second forwarding path 172 for forwarding the egress data packet. For example in FIG. 1, first forwarding path 171 may be selected. At 825 and 830, host-B 110B configures the egress data packet to include an instruction to cause the egress data packet to be forwarded via first forwarding path 171 (in the reverse direction) before sending the egress data packet via switches 121-122, 131-132, 141-142. Alternatively, the packet may be made to go through selected forwarding path 171 by choosing transport protocol source port number appropriately. It should be noted that path selection may require state information to be fed back from Host-B 110B to Host-A 110A for Host-A 110A to select paths appropriately—since even though paths may be symmetric, link utilization, congestion state are not symmetric.

The selection at block 820 may be based on any suitable criterion or criteria. For example, at block 415 in FIG. 4, host-A 110A may configure the instruction to cause intermediate network devices to add additional metadata, such as ingress port information (e.g., ingress timestamp, ingress port RX packet count, ingress port RX byte count, ingress port drop count, ingress port RX utilization), egress port information (e.g., egress timestamp, hop latency, egress port TX packet count, egress port TX byte count, egress port drop count, egress port TX link utilization) and buffer information (e.g., queue occupancy information, queue congestion status, queue drop count, etc.). In this case, host-B 110B may process the metadata to determine congestion state information associated with first forwarding path 171 and second forwarding path 172. In this case, the selection may be performed based on the congestion state information to select, for example, first forwarding path 171.

The configuration at block 825 may involve modifying header information of the egress data packet (e.g., adding an INT header) to include an instruction, such as [switch_ID=T2, port_in=i1, port_out=i2] [A2, i1, i3] [S1, i2, i1] [A1, i2, i1] [T1, i2, i1]. This way, "T2" 122, "A2" 132, "S1" 141, "A1" 131 and "T1" 121 may process the instruction to forward the egress data packet from host-B 110B to host-A 110A via first forwarding path 171 according to 835-845 in FIG. 8. At host-A 110A, the egress data packet is received and forwarded to its destination according to 850-855 in FIG. 8.

In addition to intelligent routing, examples of the present disclosure may facilitate monitoring, fault reporting and debugging as follows. For example, hosts 110A-D may report state information to a centralized management appliance that can log and/or display a heatmap. By accessing the centralized management appliance, users may select two nodes between which poor performance is being experienced. This initiates a network state discovery process between the two nodes and reports the network state periodically, flags any issues such as congestion, etc.

Examples of the present disclosure may be implemented together with packet forwarding and/or load balancing mechanisms, such as those described in U.S. patent application Ser. Nos. 15/485,089 and 15/346,569, the content of which is incorporated herein by reference in its entirety. For example, instead of relying on probe packets with randomized transport protocol source port numbers, examples of the present disclosure may be used during network topology discovery to facilitate subsequent packet forwarding and/or load balancing.

Virtualized Computing Instances

Although described using hosts 110A-D as example "nodes," it should be understood that the examples in FIG. 1 to FIG. 8 may be implemented using virtualized computing instances, such as virtual machines, containers, a combination thereof, etc. An example is shown in FIG. 9, which is a schematic diagram illustrating example data center network 900 in which data center network topology discovery may be performed by virtualized computing instances. In the following, an example "first node" will be explained using VM5 911 (e.g., implemented by host-B 110B), an example "second node" using VM6 912 (e.g., implemented by host-A 110A) and example "intermediate network devices" using logical forwarding elements 921-922, 931-932, 941-942.

Figure 9:
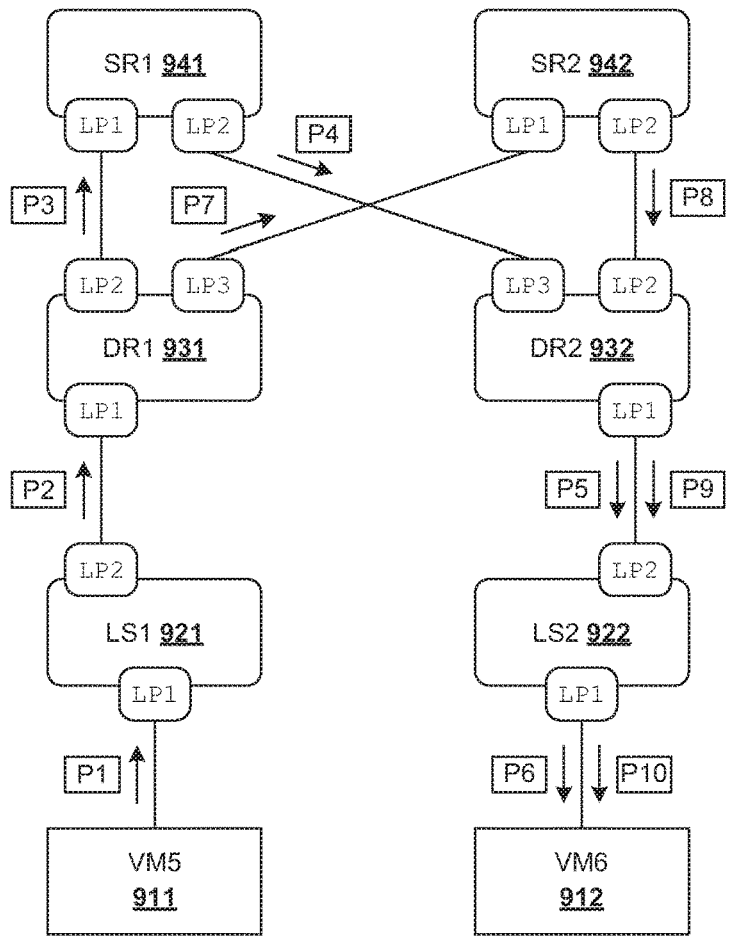
FIG. 9 is a schematic diagram illustrating an example data center network in which data center network topology discovery may be performed using virtualized computing instances.

In the example in FIG. 9, VM5 911 and VM6 912 are interconnected via logical switches 921-922 and logical routers in the form of DRs 931-932 and SRs 941-942. These logical forwarding elements are interconnected via various logical ports labelled "LP1," "LP2" and "LP3." In practice, logical switches 921-922 and DRs 931-932 may be implemented in a distributed manner and span multiple hosts (e.g., host-A 110A and host-B 110B) to connect VMs 911-912. According to examples of the present disclosure, data center network topology discovery may be performed by one node (e.g., probe packet recipient VM6 912) based on probe packets that are received in response to a probing process initiated by another node (e.g., probe packet originator VM5 911). This is based on capabilities of logical forwarding elements 921-922, 931-932, 941-942 to add metadata to probe packets during the probing process.

According to 310 in FIG. 3, VM6 912 receives multiple probe packets that include a first probe packet labelled "P6" (see 956 in FIG. 9) and a second probe packet labelled "P10" (see 960 in FIG. 9). The probe packets may be received in response to a probing process initiated by VM5 911. According to 320 and 330 in FIG. 3, VM6 912 extracts first metadata from first probe packet "P6" and second metadata from second probe packet "P10." According to 340 in FIG. 3, VM6 912 processes the first metadata and the second metadata to identify respective first forwarding path 971 and second forwarding path 972 from VM5 911 to VM6 912.

In the example in FIG. 9, first probe packet "P6" 956 received by VM6 912 may include first metadata added by "LS1" 921, "DR1" 931, "SR1" 941, "DR2" 932 and "LS2" 922 ("first subset of the intermediate network devices") based on a first instruction in the first probe packet. In this case, VM6 912 may identify "LS1" 921 based on [LS1, LP1, LP2], "DR1" 931 based on [DR1, LP1, LP2], "SR1" 941 based on [SR1, LP1, LP2], "DR2" 932 based on [DR2, LP3, LP1] and "LS2" 922 based on [LS2, LP2, LP1]. By processing the metadata, VM6 912 identifies a first forwarding path from VM5 911 to VM6 912 provided by a first set of intermediate network devices=[LS1, DR1, SR1, DR2, LS2]. See corresponding 971 and probe packets 951-956 in FIG. 9.

Second probe packet "P10" 960 received by VM6 912 may include second metadata added by "LS1" 921, "DR1" 931, "SR2" 942, "DR2" 932 and "LS2" 922 ("second subset of the intermediate network devices") based on a second instruction in the second probe packet. In this case, VM6 912 may identify "LS1" 921 based on [LS1, LP1, LP2], "DR1" 931 based on [DR1, LP1, LP3], "SR2" 942 based on [SR2, LP1, LP2], "DR2" 932 based on [DR2, LP3, LP1] and "LS2" 922 based on [LS2, LP2, LP1]. By processing the metadata, VM6 912 identifies a second forwarding path from VM5 911 to VM6 912 provided by a second set of intermediate network devices=[LS1, DR1, SR1, DR2, LS2]. See corresponding 972 and probe packets 951-952, 957-960 in FIG. 9.

Similar to the examples in FIG. 4 to FIG. 8, forwarding paths learned during data center network topology discovery may be used to facilitate continuous monitoring and fault reporting, debugging of application performance problems, intelligent routing or packet forwarding where routing decisions are driven by VMs 911-912 instead of logical forwarding elements 921-922, 931-932, 941-942 connecting them, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 9. For example, the instructions or program code, when executed by the processor of the computer system, may cause the processor to implement a "first node" to perform data center network topology in data center network 100/500/600/900 according to examples of the present disclosure. As described above, the computer system may implement a "node" in the form of a physical host (e.g., hosts 110A-D in FIG. 1 to FIG. 8) or a virtualized computing instance (e.g., VMs 911-912 in FIG. 9).

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a first node to perform data center network topology discovery in a data center network that includes the first node, a second node configured to generate an initial probe packet and multiple intermediate network devices, wherein the method comprises:
receiving multiple probe packets that include a first probe packet and a second probe packet, wherein the initial probe packet includes a replication instruction for at least one intermediate network device with multiple egress ports of the multiple intermediate network devices to replicate a received probe packet, and wherein the at least one intermediate network device generates a first modified probe packet and a second modified probe packet based on the replicated received probe packet;
prior to having received any probe packet associated with another initial probe packet generated by the second node:
extracting, from the first probe packet, first metadata that is added by a first subset of the multiple intermediate network devices based on a first instruction in the first probe packet, wherein the first metadata includes metadata of the first modified probe packet;
extracting, from the second probe packet, second metadata that is added by a second subset of the multiple intermediate network devices based on a second instruction in the second probe packet, wherein the second metadata includes metadata of the second modified probe packet; and
processing the first metadata and the second metadata to identify respective first forwarding path and second forwarding path from the second node to the first node, wherein the first forwarding path is provided by the first subset and the second forwarding path is provided by the second subset.

2. The method of claim 1, wherein processing the first metadata and the second metadata comprises:
identifying the first forwarding path based on the first metadata that includes device-level information, ingress port information and egress port information associated with each intermediate network device in the first subset; and
identifying the second forwarding path based on the second metadata that includes the device-level information, ingress port information and egress port information associated with each intermediate network device in the second subset.

3. The method of claim 2, wherein processing the first metadata and the second metadata comprises one or more of the following:
processing device-level information that includes a switch identifier (ID) to identify a particular intermediate network device in the first subset or the second subset;
processing ingress port information associated with the particular intermediate network device: an ingress port ID, ingress timestamp, ingress port receive (RX) packet count, ingress port RX byte count, ingress port drop count, ingress port RX utilization;
processing egress port information associated with the particular intermediate network device: egress port ID, egress timestamp, hop latency, egress port transmit (TX) packet count, egress port TX byte count, egress port drop count, egress port TX link utilization; and
processing buffer information associated with the particular intermediate network device: a queue ID, queue occupancy information, queue congestion status and queue drop count.

4. The method of claim 1, wherein receiving the first probe packet and the second probe packet comprises:
receiving the first probe packet that includes a first inband telemetry (INT) header storing a first identifier of the second node, the first instruction and the first metadata; and
receiving the second probe packet that includes a second INT header storing a second identifier of the second node, the second instruction and the second metadata.

5. The method of claim 1, wherein the method further comprises:
generating and sending, to the second node, information associated with the first forwarding path and the second forwarding path to enable the second node to identify the first forwarding path and the second forwarding path.

6. The method of claim 1, wherein the method further comprises:
detecting an egress data packet addressed to a destination that is supported by the second node or reachable via the second node;
selecting, from multiple forwarding paths that include the first forwarding path and the second forwarding path, a particular forwarding path for the egress data packet;
configuring the egress data packet to include an instruction to cause the egress data packet to be forwarded via the particular forwarding path;
sending the egress data packet.

7. The method of claim 1, wherein the method further comprises:
receiving a third probe packet and a fourth probe packet in response to a probing process initiated by a third node in the data center network;
extracting third metadata from the third probe packet and fourth metadata from the fourth probe packet, wherein the third metadata is added to the third probe packet by a third subset of the multiple intermediate network devices, and the fourth metadata is added to the fourth probe packet by a fourth subset of the multiple intermediate network devices; and
processing the third metadata and the fourth metadata to identify respective third forwarding path and fourth forwarding path from the third node to the first node, wherein the third forwarding path is provided by the third subset and the fourth forwarding path is provided by the fourth subset.

8. A non-transitory computer-readable storage medium that includes a set of instructions which, in response to execution by a processor of a computer system, cause the processor to implement a method for a first node to perform data center network topology discovery in a data center network that includes the first node, a second node configured to generate an initial probe packet and multiple intermediate network devices, wherein the method comprises:
  receiving multiple probe packets that include a first probe packet and a second probe packet, wherein the initial probe packet includes a replication instruction for at least one intermediate network device with multiple egress ports of the multiple intermediate network devices to replicate a received probe packet, and wherein the at least one intermediate network device generates a first modified probe packet and a second modified probe packet based on the replicated received probe packet;
  prior to having received any probe packet associated with another initial probe packet generated by the second node:
  extracting, from the first probe packet, first metadata that is added by a first subset of the multiple intermediate network devices based on a first instruction in the first probe packet, wherein the first metadata includes metadata of the first modified probe packet;
  extracting, from the second probe packet, second metadata that is added by a second subset of the multiple intermediate network devices based on a second instruction in the second probe packet, wherein the second metadata includes metadata of the second modified probe packet; and
  processing the first metadata and the second metadata to identify respective first forwarding path and second forwarding path from the second node to the first node, wherein the first forwarding path is provided by the first subset and the second forwarding path is provided by the second subset.

9. The non-transitory computer-readable storage medium that includes a set of instructions of claim 8, wherein processing the first metadata and the second metadata comprises:
  identifying the first forwarding path based on the first metadata that includes device-level information, ingress port information and egress port information associated with each intermediate network device in the first subset; and
  identifying the second forwarding path based on the second metadata that includes the device-level information, ingress port information and egress port information associated with each intermediate network device in the second subset.

10. The non-transitory computer-readable storage medium that includes a set of instructions of claim 9, wherein processing the first metadata and the second metadata comprises one or more of the following:
  processing device-level information that includes a switch identifier (ID) to identify a particular intermediate network device in the first subset or the second subset;
  processing ingress port information associated with the particular intermediate network device: an ingress port ID, ingress timestamp, ingress port receive (RX) packet count, ingress port RX byte count, ingress port drop count, ingress port RX utilization;
  processing egress port information associated with the particular intermediate network device: egress port ID, egress timestamp, hop latency, egress port transmit (TX) packet count, egress port TX byte count, egress port drop count, egress port TX link utilization; and
  processing buffer information associated with the particular intermediate network device: a queue ID, queue occupancy information, queue congestion status and queue drop count.

11. The non-transitory computer-readable storage medium that includes a set of instructions of claim 8, wherein receiving the first probe packet and the second probe packet comprises:
  receiving the first probe packet that includes a first inband telemetry (INT) header storing a first identifier of the second node, the first instruction and the first metadata; and
  receiving the second probe packet that includes a second INT header storing a second identifier of the second node, the second instruction and the second metadata.

12. The non-transitory computer-readable storage medium that includes a set of instructions of claim 8, wherein the method further comprises:
  generating and sending, to the second node, information associated with the first forwarding path and the second forwarding path to enable the second node to identify the first forwarding path and the second forwarding path.

13. The non-transitory computer-readable storage medium that includes a set of instructions of claim 8, wherein the method further comprises:
  detecting an egress data packet addressed to a destination that is supported by the second node or reachable via the second node;
  selecting, from multiple forwarding paths that include the first forwarding path and the second forwarding path, a particular forwarding path for the egress data packet;
  configuring the egress data packet to include an instruction to cause the egress data packet to be forwarded via the particular forwarding path;
  sending the egress data packet.

14. The non-transitory computer-readable storage medium that includes a set of instructions of claim 8, wherein the method further comprises:
  receiving a third probe packet and a fourth probe packet in response to a probing process initiated by a third node in the data center network;
  extracting third metadata from the third probe packet and fourth metadata from the fourth probe packet, wherein the third metadata is added to the third probe packet by a third subset of the multiple intermediate network devices, and the fourth metadata is added to the fourth probe packet by a fourth subset of the multiple intermediate network devices; and
  processing the third metadata and the fourth metadata to identify respective third forwarding path and fourth forwarding path from the third node to the first node, wherein the third forwarding path is provided by the third subset and the fourth forwarding path is provided by the fourth subset.

15. A computer system configured to perform data center network topology discovery in a data center network that includes a first node, a second node configured to generate an initial probe packet, and multiple intermediate network devices, wherein the computer system comprises:

a processor; and a non-transitory computer-readable medium having stored thereon instructions that, when executed by the processor, cause the processor to implement the first node to perform the following:

receive multiple probe packets that include a first probe packet and a second probe packet, wherein the initial probe packet includes a replication instruction for at least one intermediate network device with multiple egress ports of the multiple intermediate network devices to replicate a received probe packet, and wherein the at least one intermediate network device generates a first modified probe packet and a second modified probe packet based on the replicated received probe packet;

prior to having received any probe packet associated with another initial probe packet generated by the second node:

extract, from the first probe packet, first metadata that is added by a first subset of the multiple intermediate network devices based on a first instruction in the first probe packet, wherein the first metadata includes metadata of the first modified probe packet;

extract, from the second probe packet, second metadata that is added by a second subset of the multiple intermediate network devices based on a second instruction in the second probe packet, wherein the second metadata includes metadata of the second modified probe packet; and process the first metadata and the second metadata to identify respective first forwarding path and second forwarding path from the second node to the first node, wherein the first forwarding path is provided by the first subset and the second forwarding path is provided by the second subset.

16. The computer system of claim 15, wherein instructions for processing the first metadata and the second metadata cause the processor to:

identify the first forwarding path based on the first metadata that includes device-level information, ingress port information and egress port information associated with each intermediate network device in the first subset; and identify the second forwarding path based on the second metadata that includes the device-level information, ingress port information and egress port information associated with each intermediate network device in the second subset.

17. The computer system of claim 16, wherein instructions for processing the first metadata and the second metadata cause the processor to perform one or more of the following:

process device-level information that includes a switch identifier (ID) to identify a particular intermediate network device in the first subset or the second subset;

process ingress port information associated with the particular intermediate network device: an ingress port ID, ingress timestamp, ingress port receive (RX) packet count, ingress port RX byte count, ingress port drop count, ingress port RX utilization;

process egress port information associated with the particular intermediate network device: egress port ID, egress timestamp, hop latency, egress port transmit (TX) packet count, egress port TX byte count, egress port drop count, egress port TX link utilization; and process buffer information associated with the particular intermediate network device: a queue ID, queue occupancy information, queue congestion status and queue drop count.

18. The computer system of claim 15, wherein instructions for receiving the first probe packet and the second probe packet cause the processor to:

receive the first probe packet that includes a first inband telemetry (INT) header storing a first identifier of the second node, the first instruction and the first metadata; and receive the second probe packet that includes a second INT header storing a second identifier of the second node, the second instruction and the second metadata.

19. The computer system of claim 15, wherein the instructions further cause the processor to:

generate and send, to the second node, information associated with the first forwarding path and the second forwarding path to enable the second node to identify the first forwarding path and the second forwarding path.

20. The computer system of claim 15, wherein the instructions further cause the processor to:

detect an egress data packet addressed to a destination that is supported by the second node or reachable via the second node;

select, from multiple forwarding paths that include the first forwarding path and the second forwarding path, a particular forwarding path for the egress data packet;

configure the egress data packet to include an instruction to cause the egress data packet to be forwarded via the particular forwarding path;

send the egress data packet.

21. The computer system of claim 15, wherein the instructions further cause the processor to:

receive a third probe packet and a fourth probe packet in response to a probing process initiated by a third node in the data center network;

extract third metadata from the third probe packet and fourth metadata from the fourth probe packet, wherein the third metadata is added to the third probe packet by a third subset of the multiple intermediate network devices, and the fourth metadata is added to the fourth probe packet by a fourth subset of the multiple intermediate network devices; and process the third metadata and the fourth metadata to identify respective third forwarding path and fourth forwarding path from the third node to the first node, wherein the third forwarding path is provided by the third subset and the fourth forwarding path is provided by the fourth subset.

* * * * *